United States Patent [19]

Rossi

[11] Patent Number: 4,819,134
[45] Date of Patent: Apr. 4, 1989

[54] INTERIOR AUTOMOBILE LIGHT

[76] Inventor: Marc A. Rossi, 106 Tamarack Ct., Sterling, Va. 22170

[21] Appl. No.: 100,839

[22] Filed: Sep. 25, 1987

[51] Int. Cl.4 .............................................. B60Q 1/00
[52] U.S. Cl. ........................................ 362/61; 362/74; 362/183; 362/190
[58] Field of Search .................. 362/61, 183, 157, 190, 362/191, 200, 202, 398, 80, 154, 155, 74; 320/2, 48; 340/636; 315/77, 84

[56] References Cited

U.S. PATENT DOCUMENTS

| 2,920,186 | 1/1960 | Timoff et al. | 362/74 |
| 3,096,941 | 7/1963 | Miller | 362/61 |
| 3,576,409 | 4/1971 | Fiddler | 362/155 |
| 3,825,740 | 7/1974 | Friedman et al. | 362/183 |
| 4,092,580 | 5/1978 | Prinsze | 320/2 |
| 4,357,648 | 11/1982 | Nelson | 362/183 |

FOREIGN PATENT DOCUMENTS

| 2410214 | 7/1979 | France | 362/183 |
| 59-117551 | 8/1984 | Japan. | |
| 2077412 | 12/1981 | United Kingdom | 362/183 |

Primary Examiner—Ira S. Lazarus
Assistant Examiner—D. M. Cox
Attorney, Agent, or Firm—Marc A. Rossi

[57] ABSTRACT

An interior automobile light is disclosed that incorporates a rechargeable energy source and a detachable mounting in order to permit the light to be used as a flashlight. The light is also connected to the electrical system of the automobile in such a manner as to be activated when a compartment door is opened.

8 Claims, 4 Drawing Sheets

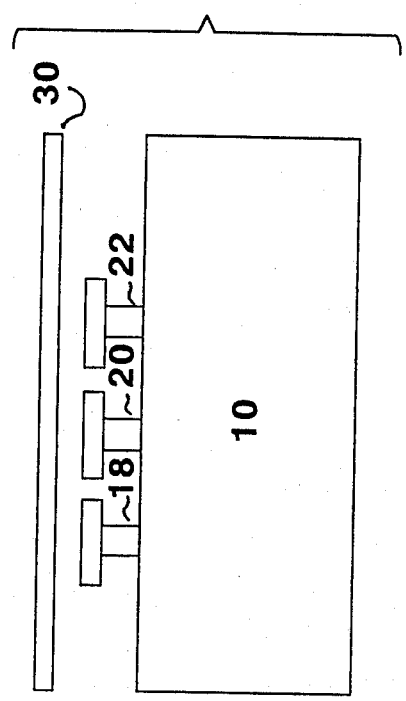
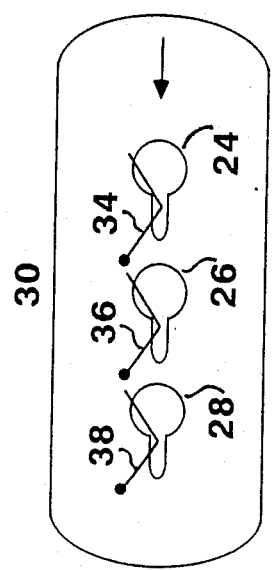

INTERIOR AUTOMOBILE LIGHT

BACKGROUND OF THE INVENTION

The invention relates in general to automobile lighting systems. In particular, the invention relates to a compartment light that can be detached and used as a flashlight.

It is known in the art to provide interior lights in automobiles to provide illumination of various compartments such as the passenger compartment, the engine compartment, and the trunk. These interior compartment lights, however, do not provide sufficient illumination in many situations, for example, when a person is searching for an object lost on the floor of the automobile. Similarly, engine compartment lights and trunk lights do not provide sufficient illumination when a person is working on an engine problem or searching for an object in the trunk. Thus, present interior compartment lights must be supplemented with a flashlight in order to provide sufficient illumination in the area of interest.

As most drivers generally need the use of a flashlight infrequently while operating their automobiles, many find the flashlight they carry in their car is inoperable because of 'dead' batteries which either need recharged or replaced. Many times the driver, to his dismay, will find his flashlight has been removed from the automobile to be used at some other location. Finding the flashlight dead or missing when they need it most, can cause the average driver a great deal of frustration.

Many attempts have been made to overcome the problems experienced above. For example, auxiliary lights that can be plugged into a cigarette lighter outlet have been provided. Freedom of movement is limited, however, by the cord of such devices. Other attempts to solve the aforementioned problems have met with only partial success.

SUMMARY OF THE INVENTION

The invention provides an interior compartment light for an automobile that can be detached from its mounting to be used as a flashlight, thereby eliminating the need for the driver to carry a separate flashlight or auxiliary light.

An object of the invention is to insure that a driver will have a conveniently located fully charged flashlight whenever one is needed.

Other objects and advantages of the present invention will become apparent from the following description of the preferred embodiments of the invention taken in conjunction with the accompanying drawings.

BRIEF DESCRIPTION OF THE DRAWINGS

FIG. 2 is a side view of a first embodiment of the present invention;

FIG. 3 illustrates a back view of a mounting plate according to a first embodiment of the present invention;

DETAILED DESCRIPTION OF THE PREFERRED EMBODIMENT

Figure 1:
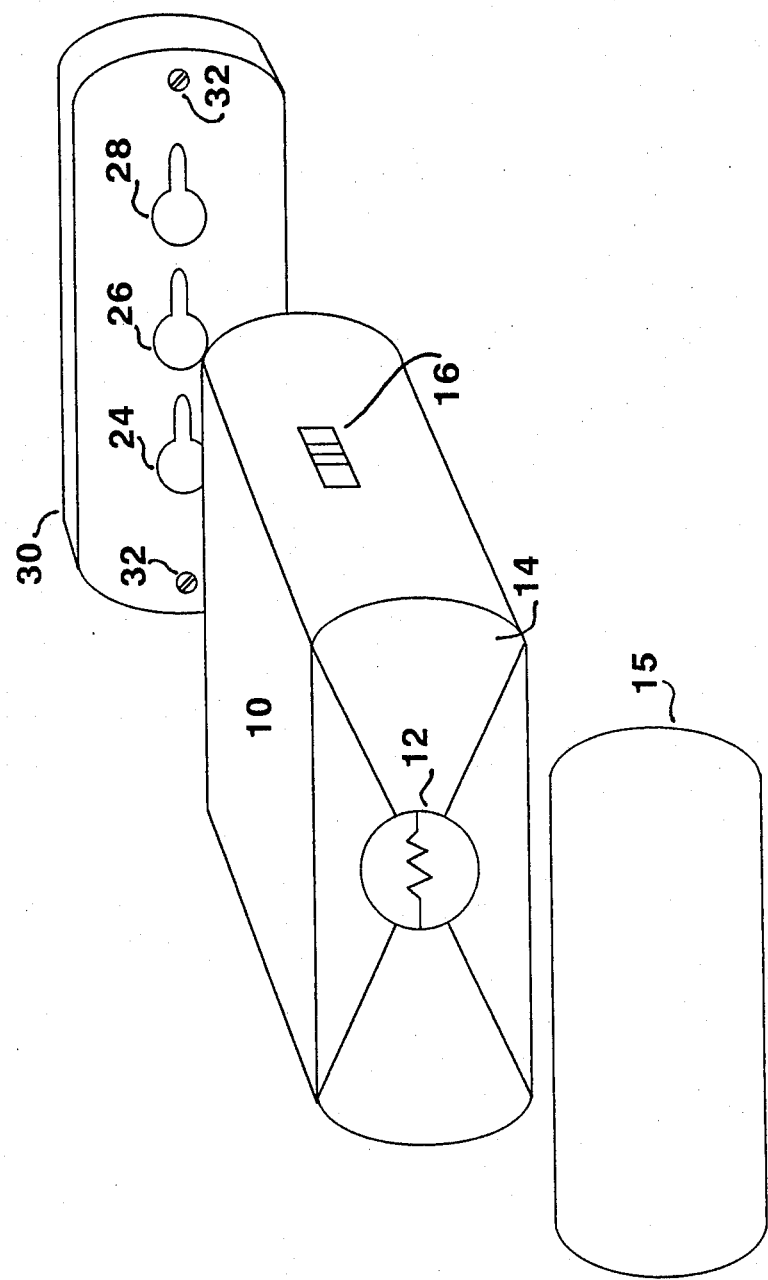
FIG. 1 is a perspective view of a first embodiment of the present invention.

Referring now to FIG. 1, an interior compartment light is shown having a housing 10, a light bulb 12, a reflector 14, a lens cover 15, and a switch 16. The housing 10 contains a rechargeable energy source not shown in FIG. 1. As shown in FIG. 2, three electrical contacts 18, 20, and 22 project from the rear of the housing. The electrical contacts 18, 20 and 22 are shaped to fit into slots 24, 26, and 28 formed in mounting plate 30.

Mounting plate 30 is attached to a surface of the compartment to be illuminated, for example the ceiling of the passenger compartment, with screws 32. Three spring type electrical contacts 34, 36, and 38 are attached on the back of the mounting plate 30 as shown in FIG. 3. The electrical contacts 34, 36, and 38 are located adjacent slots 24, 26 and 28, respectively.

Electrical connection is provided between electrical contacts 18-22 and 34-38 when the housing 10 is connected to the mounting plate 30. Specifically, electrical contacts 18-22 are placed in the slots 24-28 and the housing 10 is slid in the direction of arrow A. The shape of the slots 24-28 and the spring force of the electrical contacts 34-38 hold the housing 10 in position.

Figure 4:
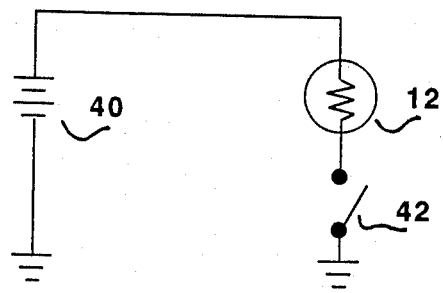
FIG. 4 illustrates a prior art automobile lighting circuit.

The operation of the invention will now be described with reference to FIGS. 4 and 5. FIG. 4 is a wiring diagram of a typical prior art interior compartment lighting system. The light bulb 12 is connected to the automobile battery 40 and to one terminal of a push-button type door switch 42. The other terminal of the door switch 42 is connected to ground. The door switch 42 is a normally closed switch so that when the door is open, the ground connection is made and the light bulb 12' is turned on. When the door is closed, the door switch 42 is opened and the ground connection is broken turning off the light.

Figure 5:
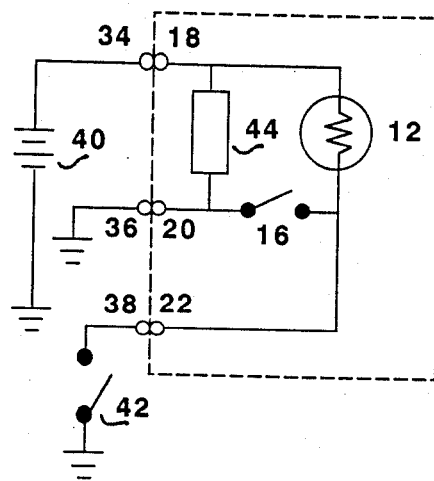
FIG. 5 illustrates a lighting circuit according to a first embodiment of the present invention.

As shown in FIG. 5, the electrical contacts 34-38 of the present invention are connected to the automobile battery 40, ground, and the door switch 42, respectively. The electrical contact 18 is connected to the rechargeable energy source 44 and the light bulb 12, the electrical contact 20 is connected to the energy source 44 and the switch 16, and the electrical contact 22 is connected to the switch 16 and the light bulb 12. The rechargeable energy source preferably contains a nickel-cadmium battery and associated regulation circuitry. When the housing 10 is mounted to mounting plate 30, electrical contacts 18-22 make contact with electrical contacts 34-38 such that the energy source 44 may be recharged from the battery 40 and the light bulb 12 is operated in a manner similar to prior art devices. When the housing 10 is detached from the mounting bracket 30, the light bulb may be turned on by closing switch 16. Thus, the compartment light can be utilized as a flashlight. Switch 16 is a two position slide type switch in this embodiment and can also be used to activate the light bulb 12 when the housing 10 is mounted to the mounting bracket 30 to provide a map light feature.

Figure 6:
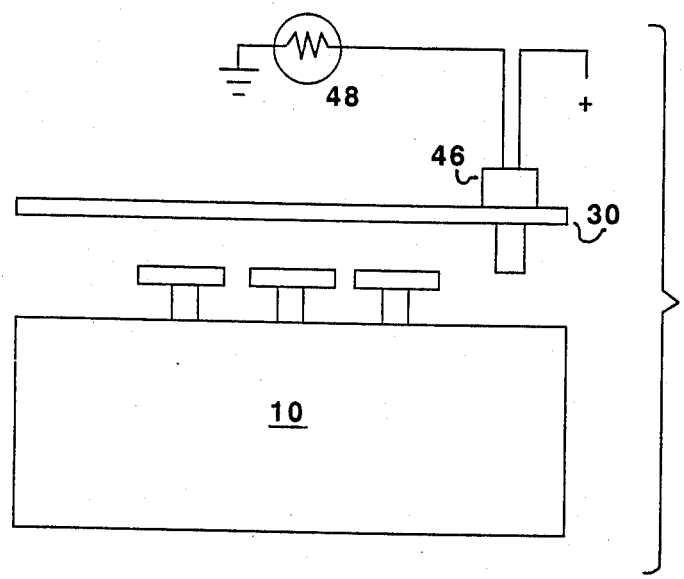
FIG. 6 is a side view of a second embodiment of the present invention.

A second embodiment of the invention is shown in FIG. 6. A pressure sensitive switch 46 is provided on the surface of the mounting plate 30. The switch 46 is connected to an indicator light 48 located on the instrument panel of the automobile. The light 48 remains off when the housing 10 is mounted on the mounting plate 30 and the switch 46 is depressed. When the housing 10 is not in place, however, the indicator light 48 is activated to remind the driver to replace the compartment light.

Figure 7:
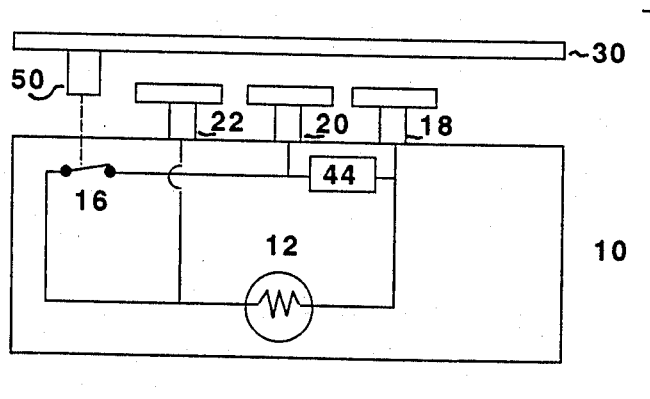
FIG. 7 is a side view of a third embodiment of the present invention.

A third embodiment of the invention is shown in FIG. 7. In this embodiment the light bulb 12 is automatically activated when the housing is removed from the bracket. Switch 16, in the embodiment shown in FIG. 7, is a spring type normally closed switch that is opened when a projection 50 on the mounting bracket 30 enters the housing 10 through a hole 52. When the housing 10 is removed from the mounting bracket 30, switch 16 closes lighting the light bulb 12. The light bulb 12 remains lighted until the housing 10 is placed on the mounting bracket 30.

Although the invention has been described with particular reference to certain preferred embodiments, modifications and variations may be effected within the spirit and scope of the invention. For example, a second light bulb with an additional lens may be incorporated to provide a more direct light source while the first light bulb and lens provide a more diffuse light source. Additionally, different circuit configurations may be employed along with structurally different electrodes.

What is claimed is:

1. A light for an automobile comprising:
   a. a housing;
   b. a rechargeable energy source and a light source mounted to said housing;
   c. a switch that provides electrical connection between said rechargeable energy source and said light source;
   d. a mounting plate having first and second electrodes that provide connection to an electrically positive line and an electrical ground, respectively, of said automobile's electrical system;
   e. third and fourth electrodes mounted to said housing and configured to contact first and second electrodes, respectively, when said housing is mounted on said mounting plate, said third electrode providing electrical connection to a first terminal of said rechargeable energy source and said fourth electrode providing electrical connection to a second terminal of said rechargeable energy source; and
   wherein said third electrode is electrically connected to a first terminal of said light source and further comprising a fifth electrode attached to said mounting plate, said fifth electrode providing electrical connection to a compartment open indicator switch mounted on said automobile, and a sixth electrode mounted on said housing electrically connected to a second terminal of said light source, said sixth electrode being configured to contact said fifth electrode when said housing is mounted on said mounting plate.

2. A light for an automobile as claimed in claim 1, further comprising a housing present indicator switch mounted on said mounting plate, said housing present indicator switch being connected to a housing missing indicator mounted on said automobile to alert an operator that said housing is not mounted to said mounting plate.

3. A light for an automobile as claimed in claim 1, further comprising a projection on said mounting plate configured to engage said switch and place said switch in said first position when said housing is mounted to said mounting bracket.

4. A light for an automobile comprising:
   a. a housing;
   b. a rechargeable energy source and a light source mounted to said housing;
   c. a switch that provides electrical connection between said rechargeable energy source and said light source;
   d. a mounting plate having first and second electrodes that provides connection to an electrically positive line and an electrical ground, respectively, of said automobile's electrical system;
   e. third and fourth electrodes mounted to said housing and configured to contact first and second electrodes, respectively, when said housing is mounted on said mounting plate, said third electrode providing electrical connection to a first terminal of said rechargeable energy source and said fourth electrode providing electrical connection to a second terminal of said rechargeable energy source; and
   f. a housing present indicator switch mounted on said mounting plate, said housing present indicator switch being connected to a housing missing indicator mounted on said automobile to alert an operator that said housing is not mounted to said mounting plate.

5. A light for an automobile comprising:
   a. a housing;
   b. a rechargeable energy source and a light source mounted to said housing;
   c. a switch that provides electrical connection between said rechargeable energy source and said light source, said switch having at least two positions, including a first position in which said light source is disconnected from said rechargeable energy source and a second position in which said light source is connected to said rechargeable energy source;
   d. a mounting plate having first and second electrodes that provides connection to an electrically positive line and an electrical ground, respectively, of said automobile's electrical system;
   e. third and fourth electrodes mounted to said housing and configured to contact first and second electrodes, respectively, when said housing is mounted on said mounting plate, said third electrode providing electrical connection to a first terminal of said rechargeable energy source and said fourth electrode providing electrical connection to a second terminal of said rechargeable energy source; and
   f. a projection on said mounting plate configured to engage said switch and place said switch in said first position when said housing is mounted to said mounting bracket, said switch returning to said second position when said housing is removed from said mounting bracket.

6. A light for an automobile comprising:
   a. housing means for retaining a light source and a rechargeable energy source;
   b. means for selectively connecting said light source to at least one of said rechargeable energy source and said automobile's electrical system;
   c. mounting means for mounting said housing means to said automobile;
   d. means for recharging said rechargeable energy source when said housing means is mounted to said automobile;
   e. means for detecting the opening of a compartment and activating said light source when said housing means is mounted to said automobile and said compartment is open; and f. indicator means coupled to said automobile for indicating said housing means is not mounted to said automobile by said mounting means.

7. A light for an automobile as claimed in claim 6, further comprising means for activating said means for selectively connecting said light source to said rechargeable energy source, when said housing means is mounted and dismounted to said automobile by said mounting means.

8. A light for an automobile comprising:
  a. housing means for retaining a light source and a rechargeable energy source;
  b. connection means for selectively connecting said light source to at least one of said rechargeable energy source and said automobile's electrical system;
  c. mounting means for mounting said housing means to said automobile;
  d. means for recharging said rechargeable energy source from said automobile's electrical system when said housing means is mounted to said automobile;
  e. indicator means coupled to said automobile for indicating said housing means is not mounted to said automobile by said mounting means; and
  f. means for activating said connection means for selectively connecting said light source to said rechargeable energy source, when said housing means is mounted and dismounted to said automobile by said mounting means.

* * * * *